(12) United States Patent
Penna (10) Patent No.: US 6,595,492 B2
(45) Date of Patent: *Jul. 22, 2003

(54) METHOD FOR DIRECTING CABLE ACROSS AN OBSTACLE

(76) Inventor: Jaime Penna, 1187 Aaron Rd., North Brunswick, NJ (US) 08902

( * ) Notice: Subject to any disclaimer, the term of this patent is extended or adjusted under 35 U.S.C. 154(b) by 28 days.

This patent is subject to a terminal disclaimer.

(21) Appl. No.: 09/930,314

(22) Filed: Aug. 15, 2001

(65) Prior Publication Data

US 2002/0066892 A1 Jun. 6, 2002

Related U.S. Application Data

(63) Continuation-in-part of application No. 09/568,352, filed on May 10, 2000, now Pat. No. 6,345,808.

(51) Int. Cl.$^7$ .............................................. E21C 29/16
(52) U.S. Cl. .............................................. 254/134.3 R
(58) Field of Search ................. 254/134.3 R, 134.3 FT, 254/134.3 CL; 15/104.33, 104.32

(56) References Cited

U.S. PATENT DOCUMENTS

| 825,070 | A | | 7/1906 | Peirce |
| 1,598,293 | A | | 8/1926 | Luck |
| 2,744,707 | A | | 5/1956 | Peterson |
| 2,975,512 | A | | 3/1961 | Somes, Jr. |
| 4,421,301 | A | * | 12/1983 | Chapman .............. 254/134.3 R |
| 4,602,763 | A | * | 7/1986 | Gaylin ................ 254/134.3 FT |
| 5,052,660 | A | * | 10/1991 | Bergman ............. 254/134.3 FT |
| 5,727,777 | A | | 3/1998 | Chikiri |
| 6,227,522 | B1 | * | 5/2001 | Chikiri et al. ........ 254/134.3 R |

* cited by examiner

Primary Examiner—Robert C. Watson
(74) Attorney, Agent, or Firm—Duane Morris LLP (57) ABSTRACT

A method for directing an aerial cable across an obstacle, includes attaching the aerial cable to one of a plurality of elongated members of an aerial cable installing apparatus; assembling the members together in tandem; suspending the members to a section of a cable or wire located on a first side of the obstacle; and sliding the apparatus along the cable or wire to a second side of the obstacle to draw the aerial cable across the obstacle. The method may also include pulling the aerial cable from the second side of the obstacle to draw additional cable across the obstacle. The method may also include connecting a cable lasher to one of the members; and pulling the apparatus back to first side of the obstacle to move the lasher along the cable or wire toward the first side of the obstacle, thus lashing the aerial cable to the cable or wire with a lashing wire.

20 Claims, 6 Drawing Sheets

Fig. 8B

METHOD FOR DIRECTING CABLE ACROSS AN OBSTACLE

CROSS-REFERENCES TO RELATED APPLICATIONS

This is a continuation-in-part of U.S. patent application Ser. No. 09/568,352, now U.S. Pat. No. 6,345,808 entitled "Obstacle Crossing Apparatus For Directing Cable" filed May 10, 2000.

FIELD OF THE INVENTION

This invention relates to a method for installing aerial cables of the type supported by utility poles, and more particularly, to a method for directing an aerial cable across an obstacle such as a road or river.

BACKGROUND OF THE INVENTION

Utility poles commonly support many different types of aerial cables including high voltage power lines, cable TV cables, telephone wires, and the like. Most utility poles are arranged along roads and highways. When additional cables are to be suspended between utility poles, specially equipped service vehicles with platforms that can be raised into the air, must be used so that a service person can install the cable to the top of the poles. Unfortunately, this often requires closing the adjacent section of the road or highway to traffic.

The above problem is exacerbated when a new cable must be suspended between utility poles located on opposites sides of the road or highway. Such a scenario often requires the redirection of traffic in the area of the work. Moreover, if the additional cables are to be suspended above existing high voltage power lines, the electricity carried thereby must be shut down prior to suspending additional cables. This in turn results in an inconvenient and sometimes costly loss of power to homes, businesses, schools, etc., that are serviced by these power lines. Accordingly, a method for installing aerial cables is needed which substantially eliminates or reduces the above problems.

SUMMARY OF THE INVENTION

A method is described herein for directing an aerial cable across an obstacle having a cable extending above the obstacle from a first side of the obstacle to a second side of the obstacle. The method comprises providing an apparatus comprising a plurality of elongated members, at least two of which slidably hold the aerial cable; attaching the aerial cable to one of the elongated members; assembling the elongated members together in tandem; suspending the elongated members to a section of the messenger wire located on the first side of the obstacle; and sliding the assembled apparatus along the cable to the second side of the obstacle, thereby drawing the cable across the obstacle from the first side of the obstacle to the second side of the obstacle.

One aspect of the method of the invention includes pulling the cable from the second side of the obstacle to draw additional cable across the obstacle.

Another aspect of the method of the invention includes providing a cable lasher that rides on the cable; connecting the cable lasher to one of the elongated members; and pulling the apparatus back to first side of the obstacle, thereby causing the cable lasher to move along the cable toward the first side of the obstacle while lashing the aerial cable to the cable with a lashing wire.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not to scale.

DETAILED DESCRIPTION OF THE INVENTION

For the sake of clarity, all elements of similar construction will have the same number designation throughout the figures.

Figures 1, 2:
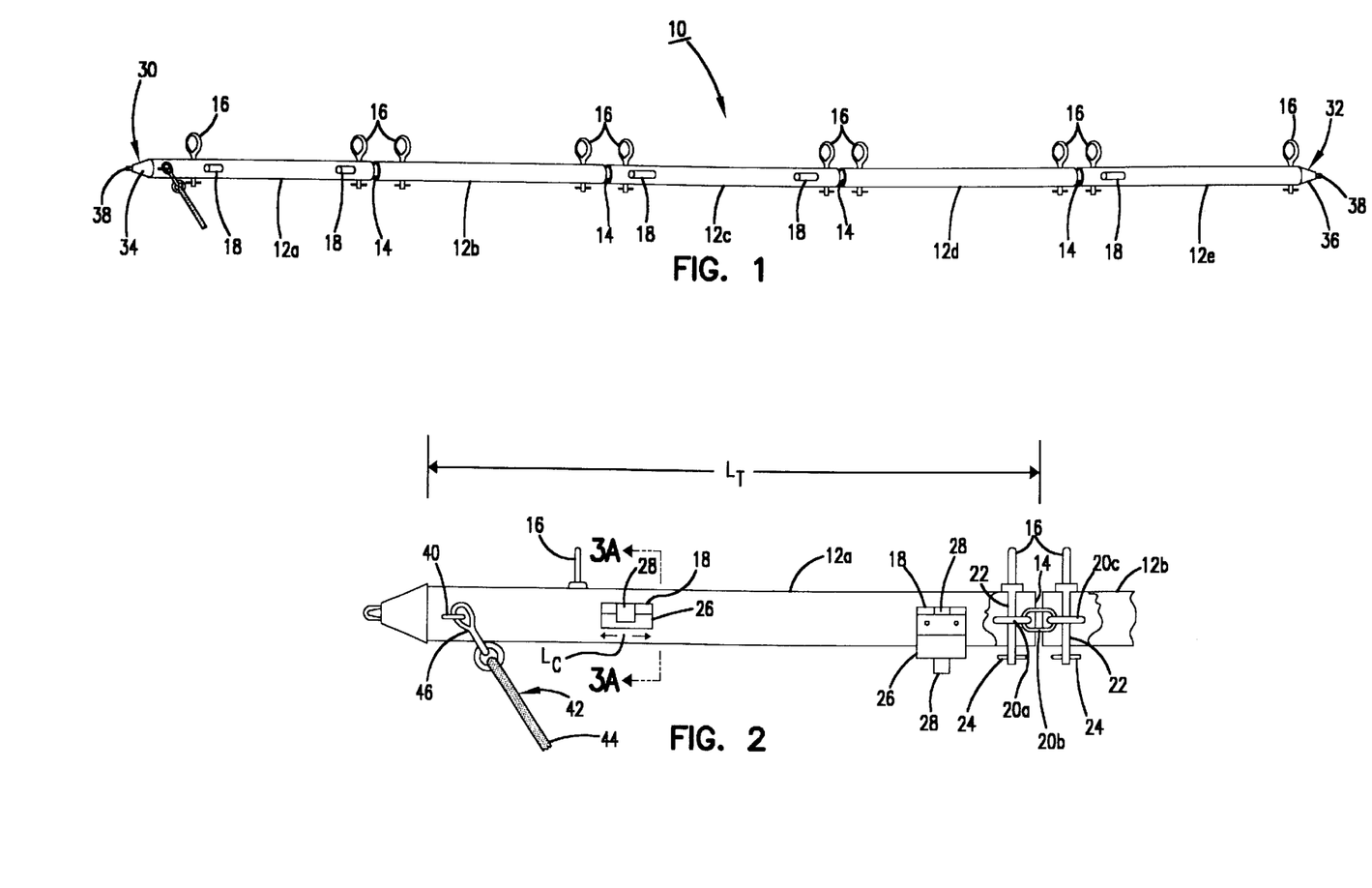
FIG. 1 is a perspective view of an assembled aerial cable installing apparatus according to an illustrative embodiment of the invention.
FIG. 2 is a perspective view of the front tube section of the apparatus.

Referring now to FIG. 1, a perspective view of an assembled aerial cable installing apparatus 10 according to an illustrative embodiment of the invention is shown. The aerial cable installing apparatus 10 of the invention comprises an assembly of elongated tube sections 12a–12e arranged end to end. The tube sections 12a–12e are assembled together in tandem by connectors 14 that permit adjacent tube sections to bend slightly relative to one another thereby providing the apparatus 10 with a degree of flexibility over a wide variety of assembled lengths. The apparatus 10 can be easily assembled to virtually any desired length by merely assembling the appropriate number of tube sections together. A plurality of suspension clips 16, attached to one or more of the tube sections, enable the apparatus 10 to be suspended from a cable, such as a steel support or messenger cable or wire 62 (FIG. 6) and slidably moveable therealong. One or more of the tube sections 12a–12e include cable holding cylinders 18 that slidably accommodate an aerial cable to be installed using the apparatus.

Figure 7:
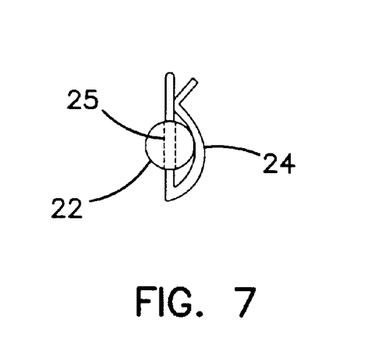
FIG. 7 is an end view of the rod member of a suspension clip showing the operation of a spring lock used in the apparatus of the invention.

As shown in FIG. 2, the tube sections 12a–12e are generally equal in length $L_T$, typically about 6 feet long, have an outer diameter $OD_T$ (FIG. 3A) of about 1.5 to 2 inches, and are made from a substantially rigid, electrically insulative material such as plastic. The connectors 14, connecting the proximate ends of adjacent tube sections, permit the tube sections 12a–12e to be assembled and disassembled as desired but prevent the sections from becoming detached while hanging cable. Each connector 14 typically comprises a length of chain links 20a, 20b, 20c which extend from within the interior of an associated tube section to the interior of an adjacent tube section. The chain links 20a–20c are retained within the interiors of the tube sections by the suspension clips 16, which include downwardly extending rod members 22 that pass through apertures (not shown) in the tube sections 12a–12 c and the end links 20a, 20c of the chain links 20. Generally R-shaped spring locks 24 (FIG. 7) extending through apertures 25 located at the marginal ends of the clip rods 22, prevent withdrawal of the clip rods 22 from the end links 20a, 20c and the tube sections 12a–12 e. One skilled in the art will recognize that the connectors 14, suspension clips 16, and spring locks 24 make the apparatus 10 easy to assemble, use, disassemble, transport and store.

Figure 3A:
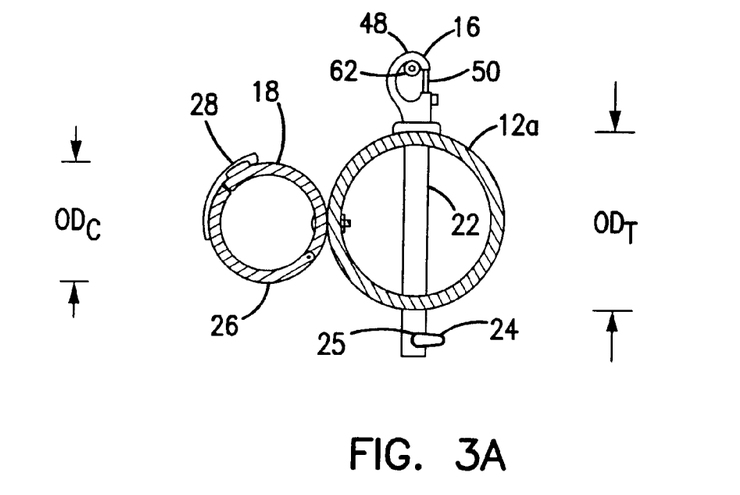
FIG. 3A is a sectional view through line 3A—3A of FIG. 2.
Figure 3B:
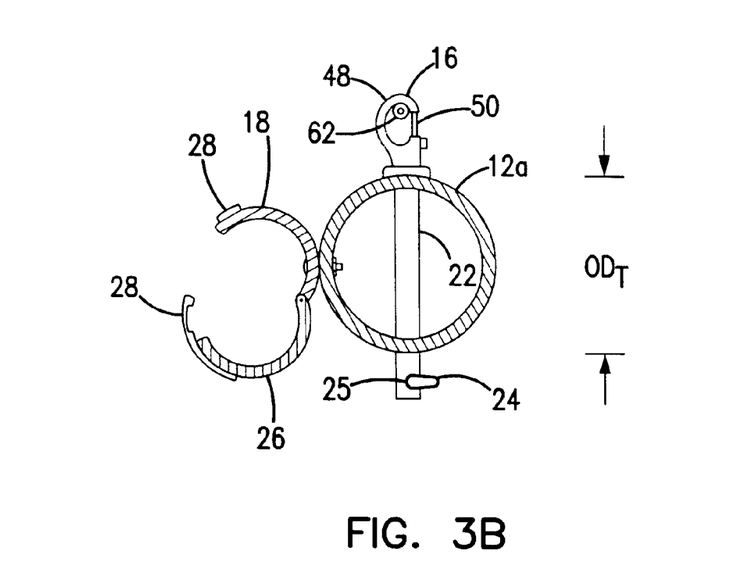
FIG. 3B is a sectional view of FIG. 3A showing the closure section of a cable holding cylinder in an open position.

The cable holding cylinders 18 are typically about 2 to 3 inches in length $L_C$, have an outer diameter $OD_C$ of usually about 1 inch, depending upon the diameter of the cable to be installed, and are made from a substantially rigid, electrically insulative material such as plastic. The cable holding cylinders 18 can be integrally molded with the side of their associated tube sections 12a–12 e, or otherwise fixedly attached thereto with conventional fasteners. As shown in FIGS. 3A and 3B, each cable holding cylinder 18 includes a pivotally hinged, split-wall closure section 26 that allows insertion and removal of a cable to be directed and/or hung. Conventional hook and loop fastening means 28 are used to retain the closure section 26 in the closed position.

Referring again to FIG. 1, only certain ones of the tube sections 12a–12 e are provided with the cable holding cylinders 18 in order to minimize friction or drag on the cable to be installed when pulling it through the holding cylinders 18 during installation thereof. For example, in the shown embodiment, only the front 12a, middle 12c, and rear tubing sections 12e have cable holding cylinders 18. In most embodiments of the invention, at least the front and rear tubing sections 12a, 12e will have the cable holding cylinders 18. The free ends 30, 32 of the front and rear tube sections 12a, 12e, are closed by conical-shaped end caps 34, 36 having protruding metallic hook elements 38 each of which allows the attachment of a rope as will be explained further on.

Figure 5:
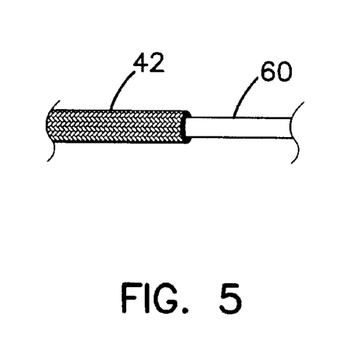
FIG. 5 is an elevational view showing the operation of the wire cuff of the apparatus.

Referring again to FIG. 2, the front tube section 12a further includes an eyelet 40 which attaches a wire cuff 42 to the front tube section 12a in front of the first cable holding cylinder 18. The wire cuff 42 attaches the leading end of the cable to be installed to the front tube section 12a of the apparatus 10 so that front tube section 12a can be used to draw the cable along as the apparatus 10 is suspended on an associated messenger cable. The wire cuff 42 is a braided element 44 which is constructed similar to well known finger cuffs. The wire cuff 42 is adapted to contract around the inserted end of the cable 60 to be installed as shown in FIG. 5 when a pulling force is applied to the cable 60. The wire cuff 42 includes a clip 46 that attaches the cuff 42 to the eyelet 40. Although the wire cuff 42 is used for clamping the end of a cable to the front tube section 12a in the shown embodiment, it should be understood that other types of cable or wire clamping means can be used for this purpose if desired.

Referring again to FIG. 3A, each of the suspension clips 16 (and the clip 46 of the wire cuff 42) typically comprises a hook member 48 with a manually operated spring biased sliding clip lock 50. The hook member 48 of the clip 16 hooks to and slides along the top of a messenger cable while the clip lock 50 prevents the hook member 48 from disengaging from the messenger cable.

Figure 4A:
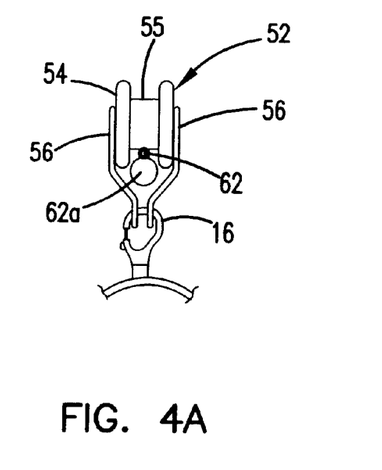
FIGS. 4A and 4B are end and side elevational views of a roller clip included in the apparatus of the invention.
Figure 4B:
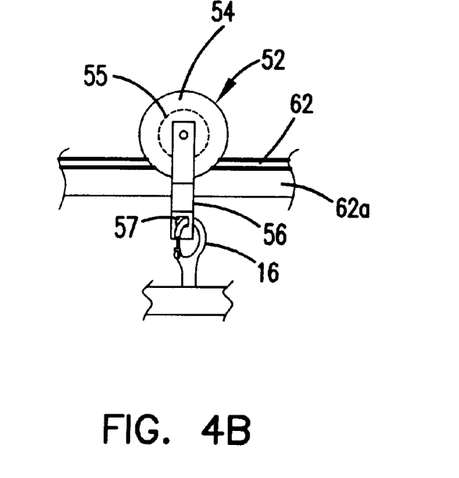

As shown in FIGS. 4A and 4B, the apparatus 10 further includes roller clips 52 that attach to the apparatus 10 via the suspension clips 16. Each roller clip 52 includes a cylindrical roller 54 with a radially inward contoured roller surface 55. The roller 54 is rotatively mounted between a pair of forks 56. The free ends of the forks 56 include apertures 57 which facilitate attachment of the roller clip 52 to the hook member 48 of a suspension clip 16. The roller clips 52 are used when the apparatus 10 is suspended from an existing large diameter cable (up to six inches in diameter, for example); such as a communications cable 62a or other similar cable which may or may not be lashed or molded together with the messenger cable 62. The radially inward contouring of the roller surface 55 conforms it to the large diameter cable 62a or combined messenger and communications cables 62, 62a so that the roller 54 can securely roll along the top of thereof without derailing. Roller clips 52 with variously sized rollers 54 can be provided for use on messenger and/or communications cable packages of different sizes.

The aerial cable installing apparatus 10 is typically transported to and from the worksite in unassembled form. Once at the worksite, a desired number of the tube sections 12a–12 e of the apparatus 10 are assembled together in tandem by inserting the chain links 14 in the open ends of the tube sections 12a–12 e; inserting the rod members 22 of the suspension clips 16 through the tube section apertures and the end links 20a, 20c of the chain links 14; and then installing the spring locks 24 into the through apertures 25 of the clip rods 22. The leading end of the aerial cable 60 to be installed is usually inserted into the wire cuff 44 attached to the front tube section and the cable 60 placed in the holding cylinders 18. The cable 60 can be placed in the holding cylinders 18 by opening the pivotally hinged, split-wall closure sections 26, placing the cable 60 in the cylinders 18 and then closing the closure sections 26 and securing them in the closed position with the hook and loop fastening means 28.

Figure 6:
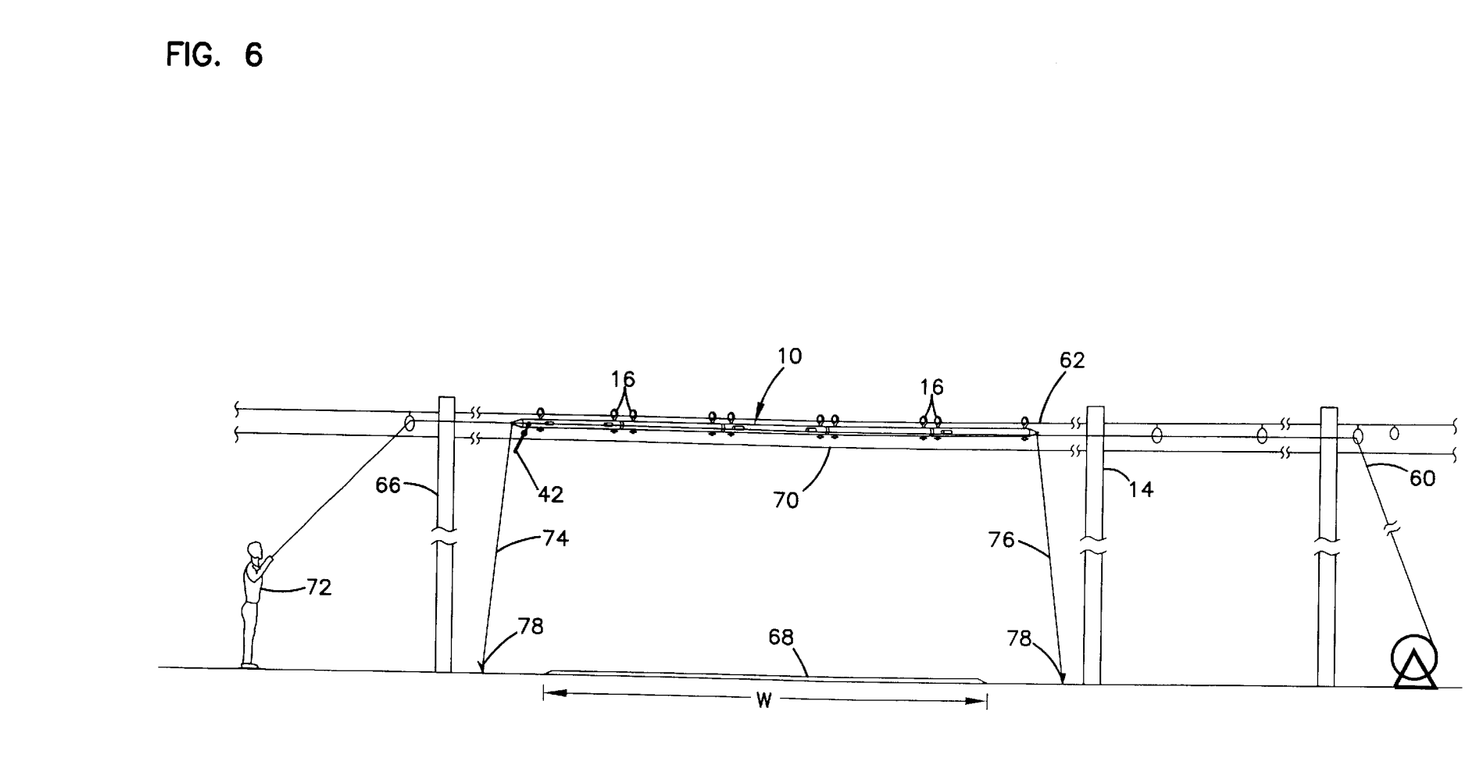
FIG. 6 is an elevational view showing the apparatus of the invention suspended from a messenger cable suspended between two utility poles.

FIG. 6 shows the assembled apparatus 10, with the cable 60 to be installed, suspended from the messenger cable 62. In the application depicted in FIG. 6, the messenger cable 62 extends between two utility poles 64, 66 disposed on opposite sides of an obstacle 68 of width W, such as a two-lane road, multi-lane highway, river, or other typical obstacle. The suspension clips 16 (or rollers 52 if, for example, the messenger cable 62 is lashed or molded to another cable 62a of a larger diameter) of each successive tube section 12a–12 e are clipped onto the messenger cable 62 adjacent one of the utility poles 64, and the apparatus 10 is directed across the obstacle 68 toward the other utility pole 66. The apparatus 10 is usually located just above the obstacle 68 and fixed in place so that it can not slide along the messenger wire 62 by attaching ropes 74, 76 to the hooks 38 at the ends of the apparatus 10 and staking the free ends of the ropes 74, 76 to the ground 78 adjacent the sides of the obstacle 68 as shown, or by tying or otherwise attaching the free ends of the ropes 74, 76 to the utility poles 64, 66. The apparatus 10 can also be fixed in place using any other suitable method. For example, clamps (not shown) can be attached to the messenger wire 62 in just in front of and behind one or more of the clips of the apparatus to prevent it from sliding along the wire 62. If the utility poles 64, 66 are close enough together to prevent movement of the apparatus 10, no ropes or clamps need be employed.

Once the cable 60 has crossed the obstacle 68, the leading end of the cable 60 can be detached from the wire cuff 42 and continuously pulled through the cable holding cylinders 18 of the suspended apparatus 10 for many miles beyond the obstacle 68. Additionally, the free ends of the ropes 74, 76 can be unstaked (or detached from the utility poles 64, 66) and the ropes 74, 76 used for sliding the apparatus 10 (pulled with the ropes 74, 76) along the messenger wire 62 to relocate it. All of the above operations can be advantageously accomplished by a single cable installer 72 if desired without having to close the road or highway (the obstacle 68) to traffic, as the installation is accomplished from the sides thereof. Moreover, because the apparatus 10 is made from an electrically insulative material, electricity carried by any lower lying power lines 70 does not have to be shut down during installation of the cable, as accidental contact with such lines with the apparatus 10 will not create an electrical safety hazard for the cable installer 72.

After a desired length of cable 60 has crossed the obstacle 68, the cable 60 can be lashed to the messenger cable 62 using any well known cable lasher. As is well known in the cable lasher art, a typical cable lasher includes a rotating drum supported on a carriage. The carriage provides a mounting for a driving mechanism, cable lifters, lashing wire and strand rollers. As the cable lasher is traverses a span of messenger cable, the lasher pays out a line of lashing wire that is helically wrapped around the cable and the messenger cable to bind them together. Cable lashers may be used for lashing one or more cables to a messenger cable or to an existing lashed cable with lashing wire. The lashing wire can be made from any suitable material, such as stainless steel. A suitable example of a cable lasher is disclosed in U.S. Pat. No. 6,062,542 to Delaney et al.

Figure 8:
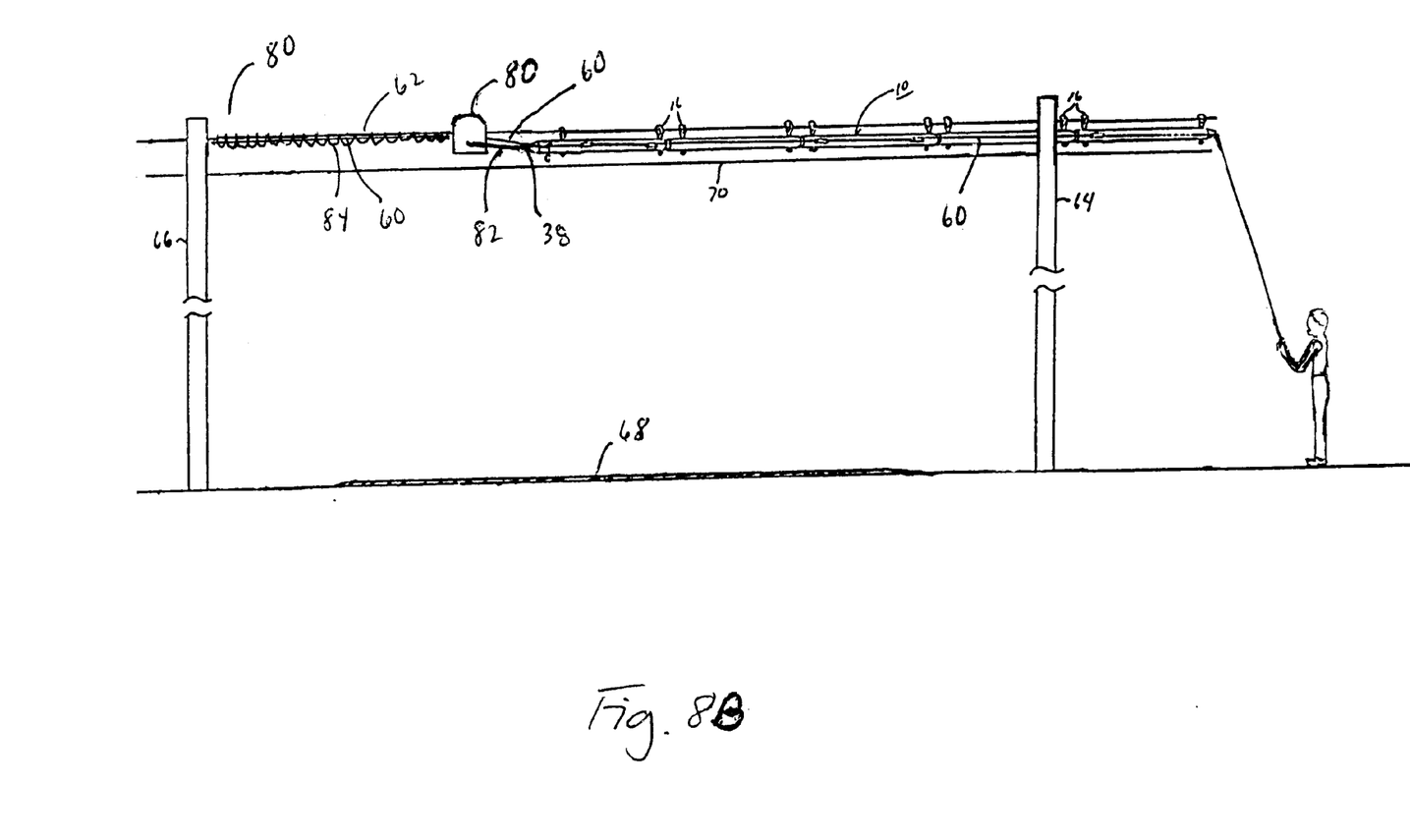
FIGS. 8A and 8B are elevational views which show the apparatus of the invention being used to operate a cable lasher.
Figure 8A:
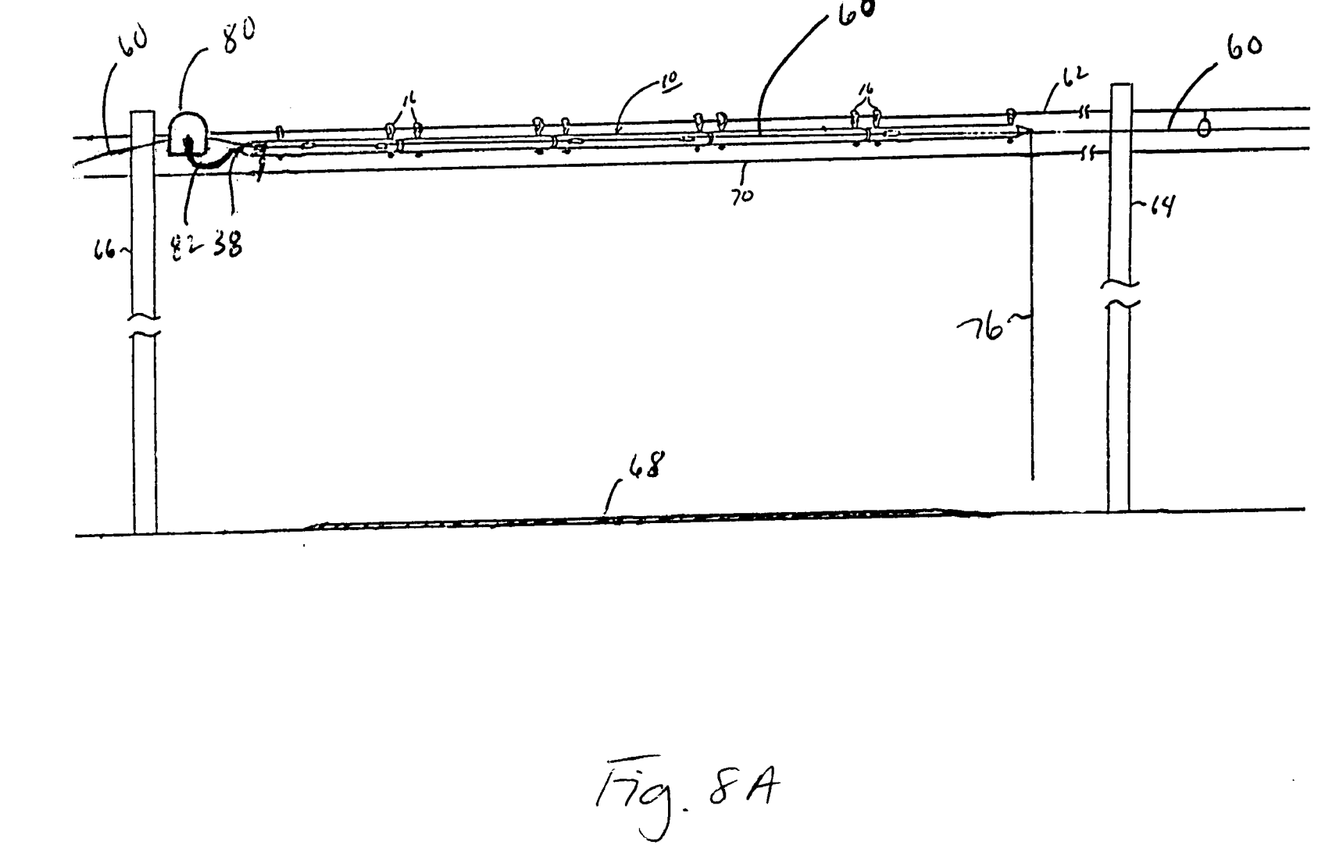

As shown in FIGS. 8A and 8B, the apparatus 10 of the invention can be used to operate a cable lasher 80. In FIG. 8A, the cable lasher 80 is mounted on the messenger cable 62 and/or an existing cable as discussed earlier (not shown), just in front of the front tube section 12a, such that the cable lasher 80 engages the loosely supported cable 60. A bridle rope 82 or similar means is used to connect the cable lasher 80 to the hook 38 of the front tube section 12a. The apparatus 10 is then pulled back across the obstacle 68 towards the utility pole 64 as shown in FIG. 8B. The tube sections 12a–12 e, starting with the rear most section 12e, are disassembled from the apparatus 10 as the apparatus 10 is pulled back to the utility pole 64. As the apparatus 10 is pulled back across the obstacle 68, the cable lasher 80 is pulled along the messenger cable 62. Movement of the cable lasher along the messenger cable 62 and/or existing cable, via the apparatus 10, causes the lasher 80 to pay out a line of lashing wire 84 that is helically wrapped around the cable 60 and messenger cable 62 and/or existing cable in order to bind the cable 60 to the tightly strung messenger cable 62 and/or existing cable.

While the foregoing invention has been described with reference to the above embodiment, additional modifications and changes can be made without departing from the spirit of the invention. Accordingly, all such modifications and changes are considered to be within the scope of the appended claims.

What is claimed is:

1. A method for directing an aerial cable across an obstacle having a cable or wire extending above the obstacle from a first side of the obstacle to a second side of the obstacle, the method comprising the steps of:

providing an apparatus comprised of a plurality of elongated members, at least two of which slidably hold the aerial cable;

attaching the aerial cable to one of the elongated members;

assembling the elongated members together in tandem;

suspending the elongated members to a section of the cable or wire located on the first side of the obstacle; and sliding the assembled apparatus along the cable or wire to the second side of the obstacle, thereby drawing the aerial cable across the obstacle from the first side of the obstacle to the second side of the obstacle.

2. The method according to claim 1, further comprising the step of pulling the aerial cable from the second side of the obstacle to draw additional aerial cable across the obstacle.

3. The method according to claim 2, further comprising the steps of:

providing a cable lasher that rides on the cable or wire;

connecting the cable lasher to one of the elongated members; and pulling the apparatus back to first side of the obstacle, thereby causing the cable lasher to move along the cable or wire toward the first side of the obstacle while lashing the aerial cable to the cable or wire with a lashing wire.

4. The method according to claim 3, wherein the elongated member to which the cable lasher is connected to in the connecting step is a leading one of the elongated members.

5. The method according to claim 1, further comprising the steps of:

providing a cable lasher that rides on the cable or wire;

connecting the cable lasher to one of the elongated members; and pulling the apparatus back to first side of the obstacle, thereby causing the cable lasher to move along the cable or wire toward the first side of the obstacle while lashing the aerial cable to the messenger wire with a lashing wire.

6. The method according to claim 5, wherein the elongated member to which the cable lasher is connected to in the connecting step is a leading one of the elongated members.

7. The method according to claim 1, wherein the elongated member to which the aerial cable is connected to in the attaching step is a leading one of the elongated members.

8. The method according to claim 7, further comprising the step of pulling the aerial cable from the second side of the obstacle to draw additional cable across the obstacle.

9. The method according to claim 8, further comprising the steps of:

providing a cable lasher that rides on the cable or wire;

connecting the cable lasher to one of the elongated members; and pulling the apparatus back to first side of the obstacle, thereby causing the cable lasher to move along the cable or wire toward the first side of the obstacle while lashing the aerial cable to the cable or wire with a lashing wire.

10. The method according to claim 9, wherein the elongated member to which the cable lasher is connected to in the connecting step is the leading one of the elongated members.

11. The method according to claim 2, further comprising the steps of:

providing a cable lasher that rides on the cable or wire;

connecting the cable lasher to one of the elongated members; and pulling the apparatus back to first side of the obstacle, thereby causing the cable lasher to move along the cable or wire toward the first side of the obstacle while lashing the aerial cable to the cable or wire with a lashing wire.

12. The method according to claim 11, wherein the elongated member to which the cable lasher is connected to in the connecting step is the leading one of the elongated members.

13. A method for directing an aerial cable across an obstacle having a cable or wire extending above the obstacle from a first side of the obstacle to a second side of the obstacle, the method comprising the steps of:

providing an apparatus comprised of a plurality of elongated members, at least two of which include an open ended enclosure attached thereto;

attaching an aerial cable to one of the elongated members;

assembling the elongated members together in tandem and positioning the aerial cable into the open ended enclosures;

suspending the elongated members to a section of the cable or wire located on the first side of the obstacle;

sliding the assembled apparatus along the cable or wire from the first side of the obstacle toward the second side of the obstacle, thereby drawing the aerial cable across the obstacle from the first side of the obstacle to the second side of the obstacle;

providing a cable lasher that rides on the cable or wire;

connecting the cable lasher to one of the elongated members; and pulling the apparatus back to first side of the obstacle, thereby causing the cable lasher to move along the cable or wire toward the first side of the obstacle while lashing the aerial cable to the cable or wire with a lashing wire.

14. The method according to claim 13, wherein prior to the cable lasher providing step further comprising the step of pulling the aerial cable through the open ended enclosures of the suspended apparatus from the second side of the obstacle to draw additional aerial cable across the obstacle.

15. The method according to claim 14, wherein the elongated member to which the cable lasher is connected to in the connecting step is a leading one of the elongated members.

16. The method according to claim 15, wherein the elongated member to which the aerial cable is connected to in the attaching step is the leading one of the elongated members.

17. The method according to claim 15, wherein the elongated member to which the aerial cable is connected to in the attaching step is the leading one of the elongated members.

18. The method according to claim 13, wherein the elongated member to which the cable lasher is connected to in the connecting step is a leading one of the elongated members.

19. The method according to claim 15, wherein the elongated member to which the aerial cable is connected to in the attaching step is the leading one of the elongated members.

20. The method according to claim 15, wherein the elongated member to which the aerial cable is connected to in the attaching step is the leading one of the elongated members.

\* \* \* \* \*